(12) United States Patent
Cheng

(10) Patent No.: US 7,463,307 B2
(45) Date of Patent: Dec. 9, 2008

(54) DISPLAY CONTROLLING DEVICE CAPABLE OF DISPLAYING MULTI-WINDOWS AND RELATED METHOD

(75) Inventor: Kun-Nan Cheng, Hsin-Chu (TW)

(73) Assignee: MStar Semiconductor, Inc., ChuPei, Hsin-Chu Hsien (TW)

( * ) Notice: Subject to any disclaimer, the term of this patent is extended or adjusted under 35 U.S.C. 154(b) by 582 days.

(21) Appl. No.: 10/907,449

(22) Filed: Apr. 1, 2005

(65) Prior Publication Data

US 2005/0219409 A1   Oct. 6, 2005

Related U.S. Application Data

(60) Provisional application No. 60/558,570, filed on Apr. 2, 2004.

(51) Int. Cl.
   H04N 7/01 (2006.01)
   H04N 5/445 (2006.01)
   H04N 9/74 (2006.01)

(52) U.S. Cl. ........... 348/448; 348/441; 348/564; 348/584; 348/588

(58) Field of Classification Search ........... 348/441, 348/448, 564, 565, 584, 588
See application file for complete search history.

(56) References Cited

U.S. PATENT DOCUMENTS

| | | | | |
|---|---|---|---|---|
| 5,475,442 A | * | 12/1995 | Matsushita et al. | 348/554 |
| 5,610,661 A | * | 3/1997 | Bhatt | 348/446 |
| 5,943,097 A | * | 8/1999 | Horii | 348/441 |
| 6,268,887 B1 | * | 7/2001 | Watanabe et al. | 348/554 |
| 6,353,460 B1 | * | 3/2002 | Sokawa et al. | 348/555 |
| 6,373,527 B1 | * | 4/2002 | Lee | 348/564 |
| 6,384,840 B1 | | 5/2002 | Frank | |
| 6,411,333 B1 | * | 6/2002 | Auld et al. | 348/441 |
| 6,421,094 B1 | * | 7/2002 | Han | 348/569 |
| 6,433,832 B2 | * | 8/2002 | Watanabe et al. | 348/554 |
| 6,556,253 B1 | | 4/2003 | Megied | |
| 6,710,817 B2 | * | 3/2004 | Oku et al. | 348/569 |
| 6,927,801 B2 | * | 8/2005 | Yugami et al. | 348/458 |
| 7,050,112 B2 | * | 5/2006 | Rieder et al. | 348/565 |
| 7,142,252 B2 | * | 11/2006 | Song | 348/565 |
| 2005/0206784 A1 | * | 9/2005 | Li et al. | 348/441 |

FOREIGN PATENT DOCUMENTS

| | | |
|---|---|---|
| EP | 0147542 | 7/1985 |
| JP | 2002258827 | 9/2002 |
| TW | 264548 | 12/1995 |
| TW | 505884 | 10/2002 |
| TW | 200300924 | 6/2003 |

* cited by examiner

Primary Examiner—Brian P Yenke
(74) Attorney, Agent, or Firm—Winston Hsu

(57) ABSTRACT

A display controlling device includes a first line buffer, a second line buffer, a buffer controller, a mixer, a de-interlacing device, a de-interlacing controller, a scaling device, a scaling controller, and a window display controller. The window display controller controls the operations of the mixer, the de-interlacing controller, and the scaling controller according to a first coordinate parameter and a second coordinate parameter, wherein a first video frame and a second video frame are displayed on a display device. The window display controller controls the de-interlacing device and the scaling device to selectively operate in either a first clock or a second clock.

9 Claims, 6 Drawing Sheets

US 7,463,307 B2

DISPLAY CONTROLLING DEVICE CAPABLE OF DISPLAYING MULTI-WINDOWS AND RELATED METHOD

CROSS REFERENCE TO RELATED APPLICATIONS

This is a non-provisional application of U.S. provisional application No. 60/558,570, which was filed on Apr. 2, 2004 and is included herein by reference.

BACKGROUND OF INVENTION

1. Field of the Invention

The present invention relates to a display controlling device and related method, and more particularly, to a display controlling device capable of displaying multi-windows and related method.

2. Description of the Prior Art

Due to the variety of scanning modes and displaying standards, a display controlling device often displays video fields after de-interlaced and scaled.

FIG. 1 is a functional block diagram of a display controlling device 10 according to the prior art. The display controlling device 10 stores received video fields in a field buffer 12, and outputs the stored video fields line by line to a line buffer 14. A de-interlacing device 16 de-interlaces scan lines stored in the line buffer 14. A scaling device 18 scales de-interlaced lines by the de-interlacing device 16. Video fields that have been de-interlaced and scaled are displayed on a display device 20.

Under consumer demand that a display controlling device should have more powerful display functions such as picture-in-picture (PIP) or picture-on-picture functions, the display controlling device 10, which can only display a single window, cannot succeed in the rapidly developing market.

FIG. 2 is a functional block diagram of another display controlling device 30 according to the prior art. The display controlling device 30 has the capability to display multi-windows. In order to display two windows at the same time, the display controlling device 30 requires two field buffers 12, two line buffers 14, two de-interlacing devices 16, and two scaling devices 18, so as to store, de-interlace, and scale a first video field and a second video field, independently. A mixer 32 mixes de-interlaced and scaled scan lines of the first video fields and the second video fields. The display device 20 displays mixed lines of the first video fields and the second video fields to display multi-windows.

Although the display controlling device 30 is capable of displaying multi-windows, the display controlling device 30 is expensive, since the prior art requires two independent sets of complicated and expensive de-interlacing devices 16 and scaling devices 18. Moreover, in order to display a third window, the display controlling device 30 further requires another de-interlacing device 16 and scaling device 18, and so, costs more.

SUMMARY OF INVENTION

It is therefore a primary objective of the claimed invention to provide a display controlling device capable of displaying multi-windows and related method to overcome the above-mentioned problems.

The display controlling device is capable of being coupled to a memory storing a plurality of first video fields and a plurality of second video fields. The display controlling device comprises a first line buffer connected to the memory for receiving first scan line data associated with the first video fields, a second line buffer connected to the memory for receiving second scan line data associated with the second video fields, a mixer connected to the first line buffer and the second line buffer for selectively outputting data stored in the first line buffer and the second line buffer, a de-interlacing device connected to the mixer for de-interlacing data outputted from the mixer according to a first de-interlacing parameter or a second de-interlacing parameter selectively; and a scaling device connected to the de-interlacing device for scaling data outputted from the de-interlacing device according to a first scaling parameter or a second scaling parameter selectively. The de-interlacing device and the scaling device operate according to either a first clock or a second clock, so that the scaling device generates a multi-windows output according to a predetermined output pixel rate.

The method receives first scan line data associated with a first video source and second scan line data associated with a second video source. The first scan line data and the second scan line data are selectively de-interlaced to generate a de-interlaced output. Then, scale the de-interlaced output to generate a scaled output according to a predetermined output pixel rate.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
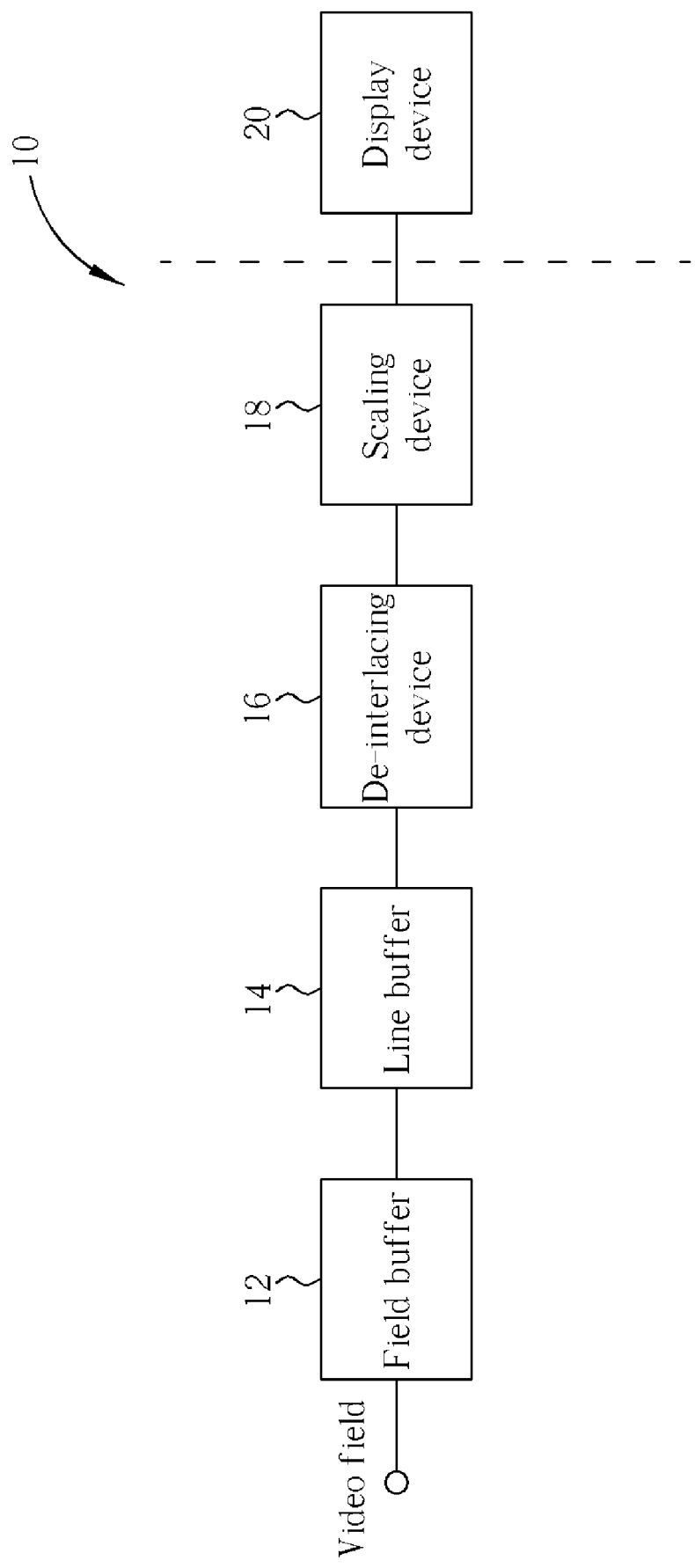
FIG. 1 is a functional block diagram of a display controlling device according to the prior art.
Figure 2:
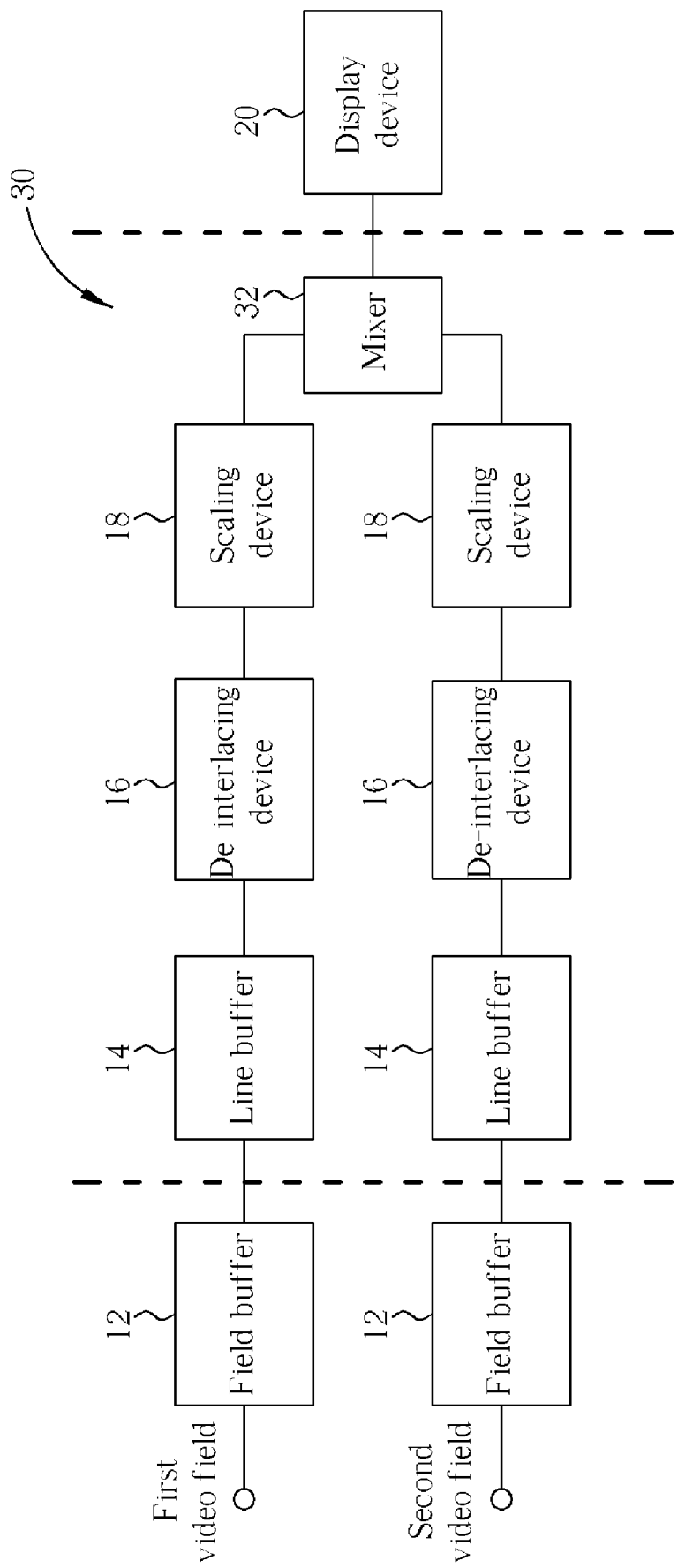
FIG. 2 is a functional block diagram of a display controlling device capable of displaying multi-windows according to the prior art.
Figure 3:
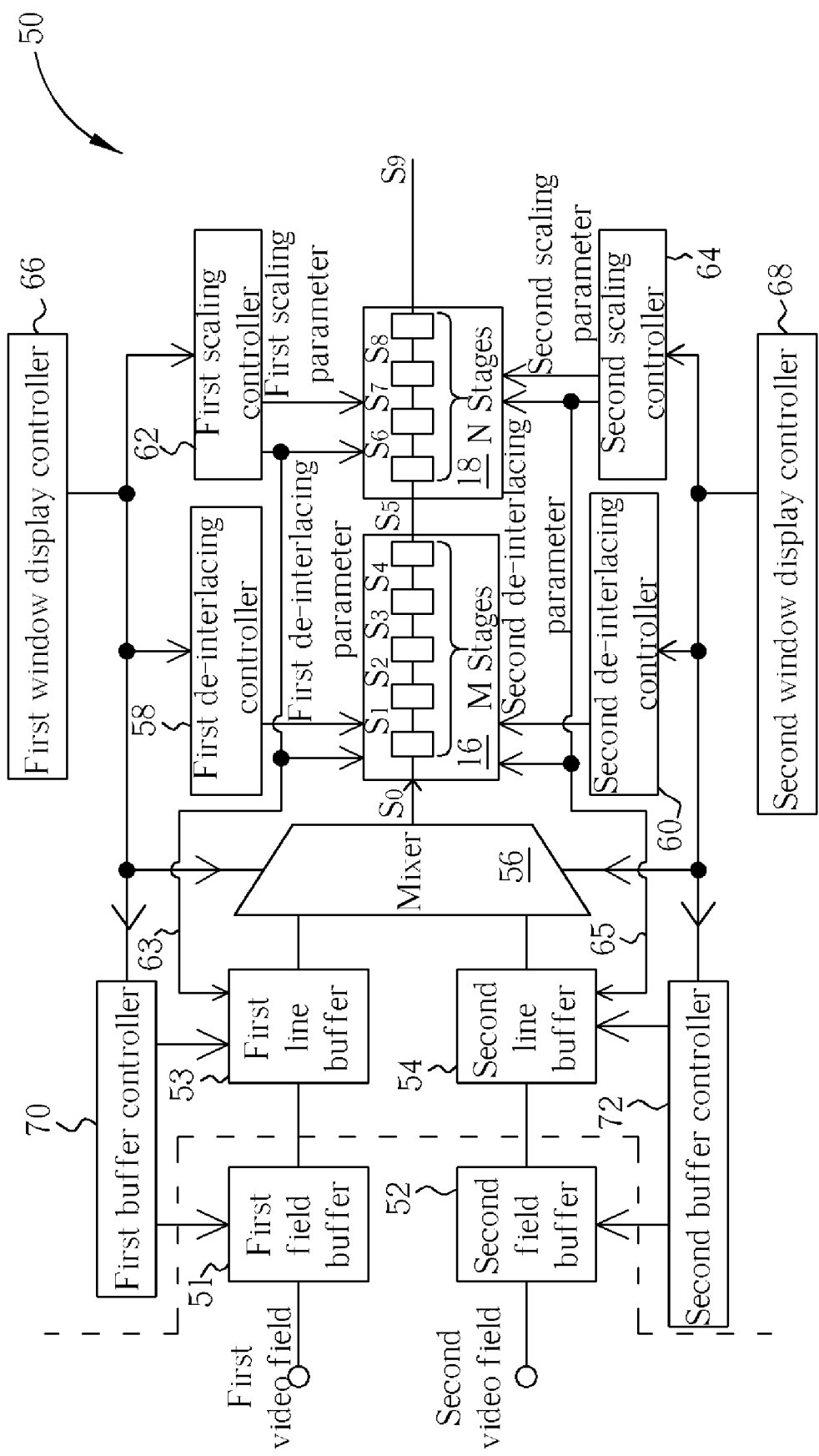
FIG. 3 is a functional block diagram of a display controlling device capable of displaying multi-windows according to one preferred embodiment of the present invention.

FIG. 3 shows a functional block diagram of a display controlling device 50 according to the preferred embodiment of the present invention. A first field buffer 51 stores the first video fields from the first video source. A first buffer controller 70 controls the first field buffer 51 to transfer the stored first video fields line by line to a first line buffer 53, and controls the first line buffer 53 to transfer the stored lines to a mixer 56. A second field buffer 52 stores the second video fields from the second video source. A second buffer controller 72 controls the second field buffer 52 to transfer the stored second video fields line by line to a second line buffer 54, and controls the second line buffer 54 to transfer the stored lines to the mixer 56.

Please note that the first field buffer 51, and the second field buffer 52 as well, is preferably implemented as various kinds of memory, such as external DRAMs and SRAMs. The first field buffer 51, and the second field buffer 52 as well, is introduced here not to restrict the hardware structure of the present invention, but to describe video fields from two different video sources. The de-interlacing device 16 de-interlaces video fields, which can be either of the first video fields and the second video fields, output from the mixer 56 according to a first de-interlacing parameter output by a first de-interlacing controller 58 or a second de-interlacing parameter output by a second de-interlacing controller 60. Similarly, the scaling device 18 scales de-interlaced video fields output from the de-interlacing device 16 according to a first scaling parameter output by a first scaling controller 62 or a second scaling parameter output by a second scaling device 64. A display device (not shown) displays scaled video fields scaled by the scaling device 18. A first window display controller 66 controls the first de-interlacing controller 58 and the first scaling controller 62 to output the first de-interlacing parameter and the first scaling parameter respectively, and controls the operation of the first buffer controller 70.

Since the timing relation to processing pixels has to be precisely controlled stage by stage, the first window display controller 66 coordinates and controls an operation sequence of the first buffer controller 70, the first de-interlacing controller 58, and the first scaling controller 62. For instance, the first window display controller 66 is capable of controlling active periods of the first buffer controller 70, the first de-interlacing controller 58, and the first scaling controller 62. At first, source pixels enter the first line buffer 53, and then progress through the mixer 56 to the de-interlacing device 16 and the scaling device 18 sequentially. Moreover, the first window display controller 66 controls the operation of the first de-interlacing controller 58 appropriately. There are various de-interlacing algorithms. Sometimes, because the video source may not need to be de-interlaced, the first window display controller 66 should prohibit the first de-interlacing controller 58 from performing de-interlace and bypass the video data of the video source to the first scaling device 62 directly. Similarly, the second window display controller 68 controls the second de-interlacing controller 60 and the second scaling controller 64 to output the second de-interlacing parameter and the second scaling parameter respectively, and controls the operation of the second buffer controller 72. Further, the first and the second window display controllers 66 and 68 control the mixer 56 to output the first field lines stored in the first line buffer 53 or the second field lines stored in the second line buffer 54 selectively. The mixer 56 can be a multiplexer.

Figure 4:
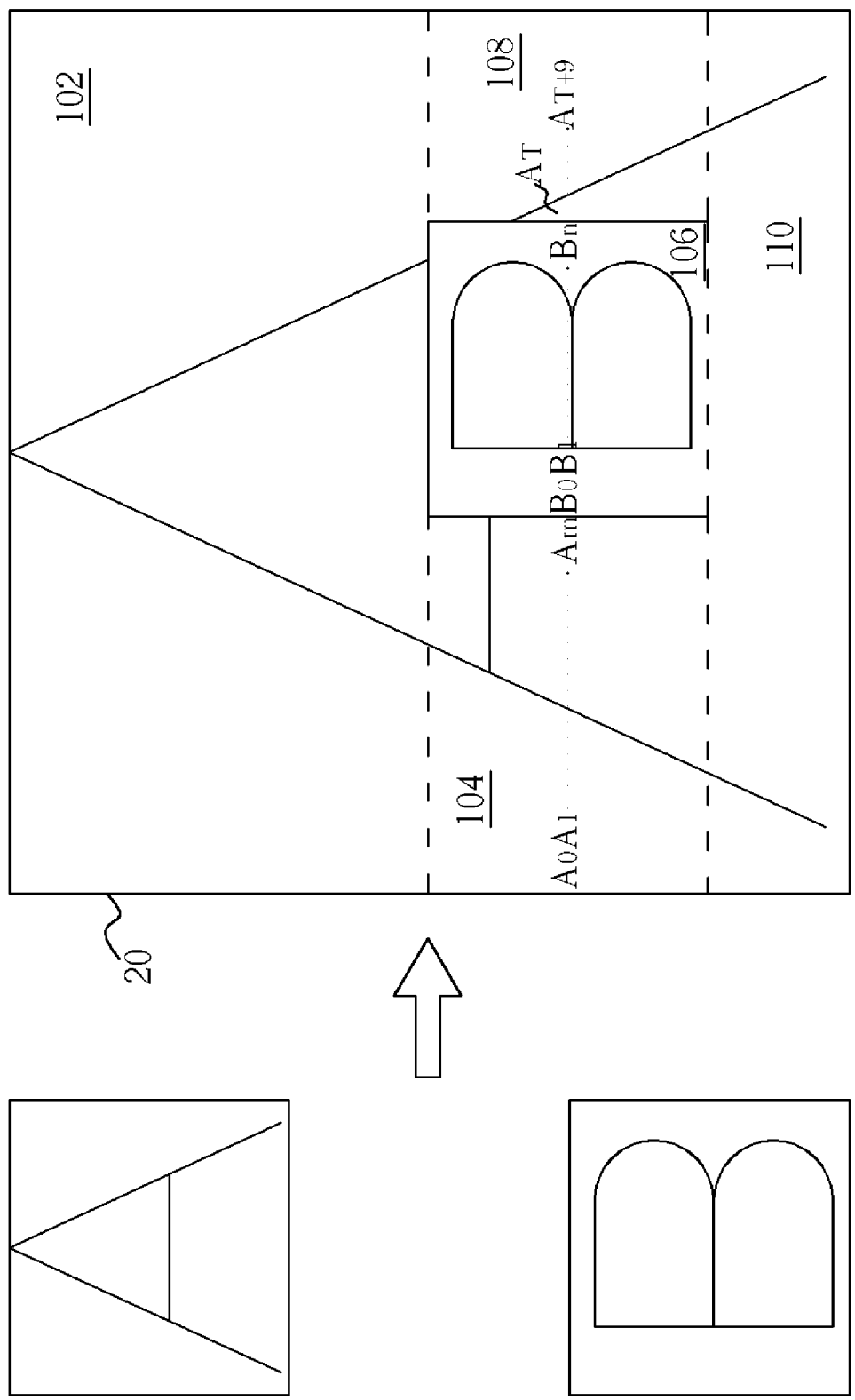
FIG. 4 is a display schematic diagram of a first video field and a second video field processed by the display controlling device in FIG. 3.

FIG. 4 shows a display schematic diagram of a first video field and a second video field processed by the display controlling device 50. The operation of the display controlling device 50 is described as follows. Assume that a first video field "A" input to the first field buffer 51 is enlarged three times to be displayed on the display device 20, and a second video "B" input to the second field buffer 52 is displayed on the display device 20 directly, without any size scaling. That is, the enlarged first video field "A" has a resolution three times the size of the original first video field "A", and the second video field "B" displayed on the display device 20 is identical to that input to the second video buffer 53. In the preferred embodiment, when processing the first video field "A", the de-interlacing device 16, and the scaling device 18 as well, operate at a first operating clock $T_{P3}$, which is one third of an output pixel rate $T_P$. For instance, when processing the first video field "A", the de-interlacing device 16 and the scaling device 18 reduce the rate to process pixels in each stage unit, since each original pixel associates with three output pixels to be displayed. In this embodiment, the de-interlacing device 16 comprises five (m) stages of de-interlacing units, and the scaling device 18 comprises four (n) stages of scaling units. That is, the de-interlacing device 16 and the scaling device 18 comprise nine stages for de-interlacing and scaling in total. Every output pixel generated by the nine stages is displayed on the display device 20 at the output pixel rate $T_P$. On the other hand, when processing the second video field "B", the de-interlacing device 16 and the scaling device 18 operate at a second operation clock $T_{P1}$, which is equal to the output pixel rate $T_P$.

In the beginning, since the display 20 only displays the first video field "A", as shown in a first part 102 of FIG. 4, the first buffer controller 70 controls the first line buffer 53 to transfer the stored the first field lines of "A" to the mixer 56 according to the first operation clock $T_{P3}$. Then the mixer 56 outputs the first field lines of "A" to the de-interlacing device 16. The first window display controller 66 controls the first de-interlacing controller 58 and the first scaling controller 62 to output the first de-interlacing parameter and the first scaling parameter respectively, and controls the de-interlacing device 16 and the scaling device 18 to de-interlace and scale the first field lines of "A" according to the first operation clock $T_{P3}$. The first scaling controller 62 calculates an operation rate of the first operation clock $T_{P3}$ according to a scaling ratio of "A", so as to control the operation rates of the first line buffer 53, the de-interlacing device 16, and the scaling device 18 through the first control signal 63. For instance, in this embodiment, when the first part 102 of the first video field "A" is output, both the de-interlacing device 16 and the scaling device 18 operate according to the first operation clock $T_{P3}$, which is one third of the output pixel rate $T_P$. Therefore, when the display device 20 is displaying the first video field "A", the de-interlacing device 16 and the scaling device 18 process the original pixels one stage rightward every three output pixels.

The display device 20 then displays a second part 104 and a third part 106 of FIG. 4. Please refer to FIG. 5, which is a timing diagram associated with the de-interlacing device 16 and the scaling device 18. All of the de-interlacing units of the de-interlacing device 16 and the scaling units of the scaling device 18 operate according to an identical clock. The scaling device 18 operates according to the first operation clock $T_{P3}$ when outputting the first video field "A" and operates according to the second operation clock $T_{P1}$ when outputting the second video field "B". Although the mixer 56, after having output completely the second part 104 of the first video field "A" from the first line buffer 52, will immediately output the third part 106 of the second video field "B" from the second line buffer 54, the first window display controller 66 does not control the de-interlacing device 16 and the scaling device 16 to operate from the first operation clock $T_{P3}$ to the second operation clock $T_{P1}$ as soon as the mixer 56 outputs the third part 106 of the second video field "B" (indicated by arrow A) to the de-interlacing device 16, but waits for nine first operation clock $T_{P3}$ periods (indicated by arrow B) instead.

During the period indicated from arrows A to B, the first window display controller 66 disables the first buffer controller 70, the first de-interlacing controller 58 and the first scaling controller 62 sequentially, while the second window display controller 68 enables the second buffer controller 72, the second de-interlacing controller 60 and the second scaling controller 64 sequentially. Accordingly, after the first buffer controller 70, operating according to the first operation clock $T_{P3}$ period, controls the first line buffer 53 to transfer the second part 104 of the first video filed "A" to the mixer 56, the second buffer controller 72 controls the second line buffer 54 to transfer the third part 106 of the second video field "B" to the mixer 56 still according to the first operation clock $T_{P3}$ period for nine first operation clock $T_{P3}$ periods. Similarly, the second scaling controller 64 calculates the operation rate of the second operation clock $T_{P1}$ according to "B"'s scaling ratio, and controls the operation rates of the second line buffer 54, the de-interlacing device 16, and the scaling device 18 through the second control signal 65. For instance, in this embodiment, after the mixer 56 outputs nine pixels for one row of the second video field "B", the de-interlacing device 16 and the scaling device 18 start to operate according to the second operation clock $T_{P1}$, which is substantially equal to the output pixel rate $T_P$, and process the original pixels one stage rightward every output pixel rate $T_P$, when the display device 20 is displaying the first video field "B".

Then, similarly, though the mixer 56 will output the fourth part 108 of the first video field "A" after outputting the third part 106 of the second video field "B", the second window display controller 68 does not control the de-interlacing device 16 and the scaling device 18 to operate from the second operation clock $T_{P1}$ back to the first operation clock $T_{P3}$ as soon as the mixer 56 starts to output the fourth part 108 of the first video field "A" ("$A_T$" indicated by arrow C), but waits for nine second operation clock $T_{P1}$ periods (indicated by arrow D). After the second buffer controller 72 controls the second line buffer 54 to transfer the third part 106 of the second video field "B" to the mixer 56 according to the second operation clock $T_{P1}$, the first buffer controller 70 controls the first line buffer 53 to transfer the fourth part 108 of the first video field "A" to the mixer 56 still according to the second operation clock $T_{P1}$ for further nine second operation clock $T_P$ periods, starting from pixels $A_T$ to $A_{T+8}$. According to the preferred embodiment, T is preferably equal to m+[n/3], or m+[n/3]+1, where [] represents a Gauss function.

Figure 5:
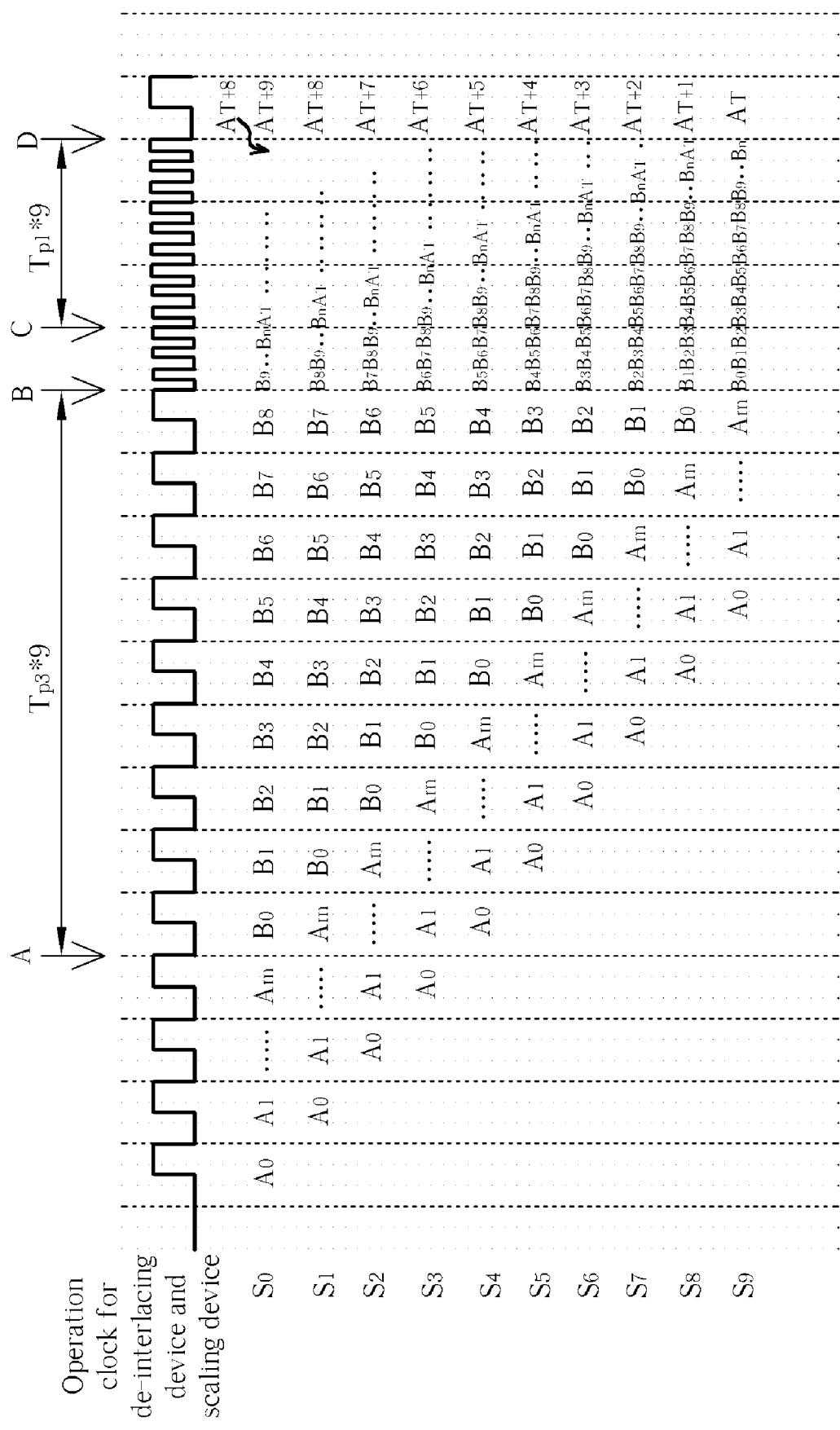
FIG. 5 is a timing diagram of de-interlacing units and scaling units of the display controlling device in FIG. 3.

Lastly, the display device 20 displays a fifth part 110 of FIG. 5. The operation of the display controlling device 50 when the display device 20 is displaying the fifth part 110 is similar to that of the display controlling device 50 when the display device 20 is displaying the first part 102, so further description is hereby omitted.

Field lines, such as coming from the first video field "A" and the second video field "B", are not immediately displayed on the display device 20 as soon as they are input to the display controlling device 50. For example, the de-interlacing device 16 and the scaling device 18 require nine operation clock periods (nine first operation clock $T_{P3}$ periods or nine second operation clock $T_P$ periods, depending on whether the first video field "A" or the second video field "B" is in advance input to the mixer 56) to be displayed. Two operation rates are switched alternately. The de-interlacing device 16 and the scaling device 18 are shared by multiple video sources. Preferably, field lines from multiple video sources are processed through the de-interlacing device 16 and the scaling device 18 utilizing pixel rate control, without introducing any erroneous video mergence at the border. The input pixel rate switching timing associates with the coordinates of the multi-windows display and how many stages the de-interlacing device 16 and the scaling device 18 contain, that is, a total number of stages in the de-interlacing device 16 and the scaling device 18. Therefore, the first window display controller 68 and the second window display controller 70 start loading the first video field "A" and the second video field "B" with (M+N) pixels leftward prior to the horizontal coordinates where the first video field "A" and the second video field "B" start to be displayed on the display device 20, respectively, wherein M is the number of de-interlacing units of the de-interlacing device 16, and N is the number of scaling units of the scaling device 18.

Figure 6:
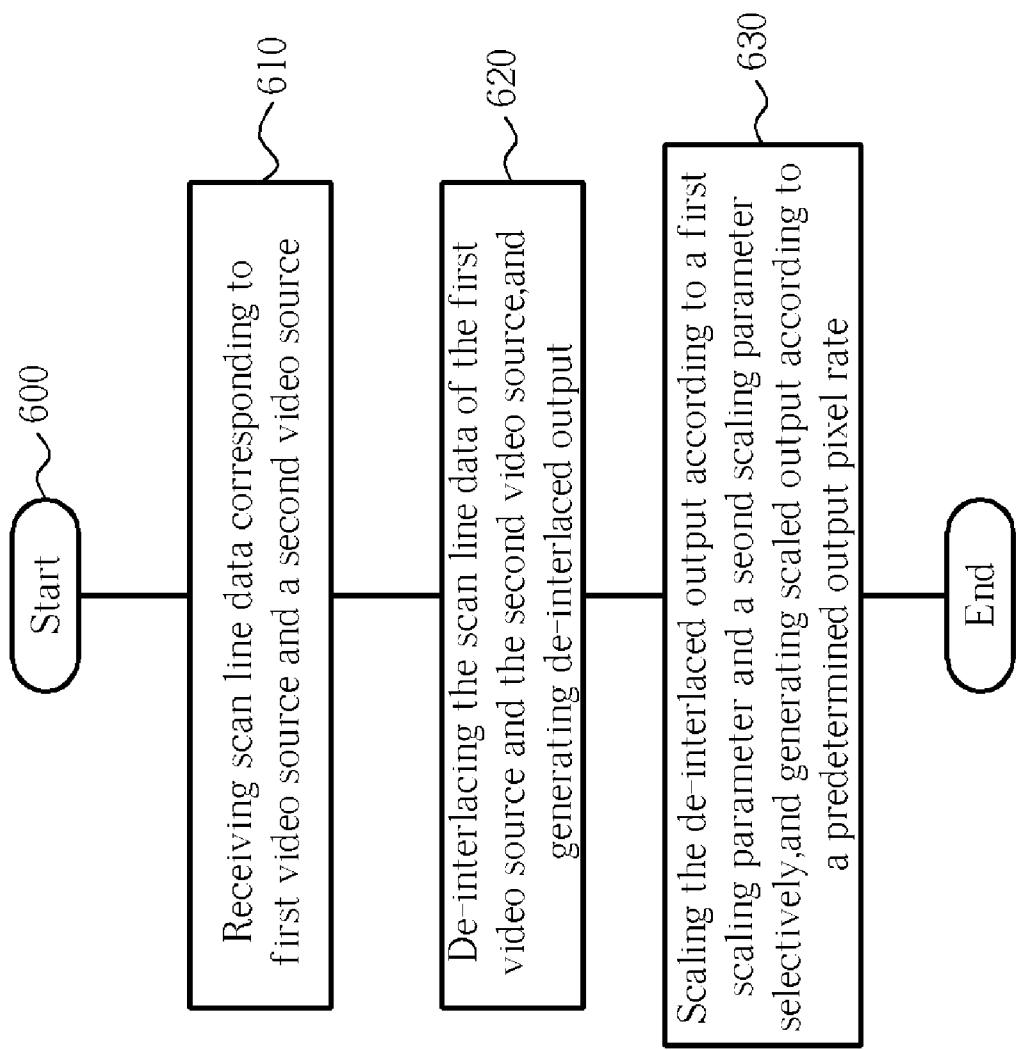
FIG. 6 is a flowchart of a method of displaying multi-windows according to the preferred embodiment of the present invention.

FIG. 6 is a flowchart of a method of displaying multiple windows from a first video source and a second video source according to the preferred embodiment of the present invention. The flowchart begins in step 600. In step 610, the first scan line data associated with the first video source and the second scan line data associated with the second video source are received. For example, the first video fields from the first video source and the second video fields from the second video source comprise the first scan line data and the second scan line data. Due to different resolutions and standards, the numbers of physical scan lines differ. For example, the NTSC standard a frame comprises 525 scan lines with 60 Hz field rate. The video fields are preferably stored in a DRAM. In step 620, selectively de-interlace the scan line data for the first video source or the second video source, to generate de-interlaced output. In order to display "A" and "B" as shown in FIG. 4, since the display controlling device 50 is designed to process data scan line by scan line, the method first selects and processes the scan line data from the first video source, and then selects and processes the scan line data from the second video source until reaching "B". Whether or not to perform the de-interlacing process depends on the characteristics of the video sources. Therefore, de-interlace the first video source and the second video source according to the first de-interlacing parameter and the second de-interlacing parameter, selectively, to generate the de-interlacing output. In step 630, scale the de-interlaced output according to the first scaling parameter and the second scaling parameter selectively, to generate the scaling output at the output pixel rate, which associates with the resolution of displayed videos. The steps of de-interlacing and scaling selectively operate according to either a first rate or a second rate. Thus, fields coming from the first video source and the second video source are processed in variable rates in order to generate multi-windows output. The first rate and the second rate associate with the scaling ratios of different video sources and the output pixel rate. Correspondingly, the receiving step cooperates with the steps of de-interlacing and scaling by receiving the scan line data of the first video source and the second video source according to the first rate and the second rate selectively.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display controlling device capable of displaying multi-windows, coupled to a memory storing a plurality of first video fields and a plurality of second video fields, the display controlling device comprising:

a first line buffer coupled to the memory for receiving a plurality of first scan line data associated with the first video fields;

a second line buffer coupled to the memory for receiving a plurality of second scan line data associated with the second video fields;

a mixer coupled to the first line buffer and the second line buffer for selectively outputting data stored in the first line buffer and the second line buffer;

a de-interlacing device coupled to the mixer for selectively de-interlacing data outputted from the mixer according to a first de-interlacing parameter and a second de-interlacing parameter selectively; and a scaling device coupled to the de-interlacing device for selectively scaling data outputted from the de-interlacing device according to a first scaling parameter and a second scaling parameter selectively, wherein the de-interlacing device and the scaling device selectively operate according to a first clock and a second clock, so that the scaling device generates a multi-windows output according to a predetermined output pixel rate.

2. The display controlling device of claim 1, wherein the mixer is a multiplexer.

3. The display controlling device of claim 1, wherein the display controlling device is capable of being coupled to a display device for displaying the scaled first video fields at a first coordinate and the scaled second video fields at a second coordinate.

4. The display controlling device of claim 1, wherein the first clock associates with the predetermined output pixel rate and the first scaling parameter, and the second clock associates with the predetermined output pixel rate and the second scaling parameter.

5. The display controlling device of claim 1 further comprising a first de-interlacing controller and a second de-interlacing controller, both coupled to the de-interlacing device, for outputting the first de-interlacing parameter and the second de-interlacing parameter to the de-interlacing device.

6. The display controlling device of claim 5 further comprising a first scaling controller and a second scaling controller, both coupled to the scaling device, for outputting the first scaling parameter and the second scaling parameter to the scaling device.

7. The display controlling device of claim 6 further comprising a first buffer controller coupled to the memory and the first line buffer, and a second buffer controller coupled to the memory and the second line buffer.

8. The display controlling device of claim 7 further comprising:

a first window display controller coupled to the first buffer controller, the mixer, the first de-interlacing controller, and the first scaling controller for controlling operations of the first buffer controller, the first de-interlacing controller, and the first scaling controller; and a second window display controller coupled to the second buffer controller, the mixer, the second de-interlacing controller, and the second scaling controller for controlling operations of the second buffer controller, the second de-interlacing controller, and the second scaling controller.

9. The display controlling device of claim 7, wherein the first scaling controller is capable of controlling operation rates of the first line buffer, the de-interlacing device, and the scaling device, and the second scaling controller is capable of controlling operation rates of the second line buffer, the de-interlacing device, and the scaling device.

* * * * *